(12) United States Patent
Gupta

(10) Patent No.: US 7,647,356 B2
(45) Date of Patent: Jan. 12, 2010

(54) METHODS AND APPARATUS FOR FACILITATING ANALYSIS OF LARGE DATA SETS

(75) Inventor: Anurag Gupta, San Mateo, CA (US)

(73) Assignee: Oracle International Corporation, Redwood Shores, CA (US)

(*) Notice: Subject to any disclaimer, the term of this patent is extended or adjusted under 35 U.S.C. 154(b) by 763 days.

(21) Appl. No.: 10/841,923

(22) Filed: May 7, 2004

(65) Prior Publication Data

US 2005/0262108 A1 Nov. 24, 2005

(51) Int. Cl.
G06F 12/00 (2006.01)
G06F 17/30 (2006.01)

(52) U.S. Cl. .................... 707/200; 707/102; 707/104.1; 707/203

(58) Field of Classification Search .................. None
See application file for complete search history.

(56) References Cited

U.S. PATENT DOCUMENTS

| | | | | |
|---|---|---|---|---|
| 5,497,486 | A * | 3/1996 | Stolfo et al. | 707/7 |
| 5,907,711 | A | 5/1999 | Benitez | |
| 6,035,306 | A * | 3/2000 | Lowenthal et al. | 707/200 |
| 6,205,447 | B1 | 3/2001 | Malloy | |
| 6,263,334 | B1 * | 7/2001 | Fayyad et al. | 707/5 |
| 6,374,252 | B1 * | 4/2002 | Althoff et al. | 707/102 |
| 6,393,434 | B1 * | 5/2002 | Huang et al. | 707/200 |
| 6,466,950 | B1 * | 10/2002 | Ono | 707/201 |
| 6,493,699 | B2 | 12/2002 | Colby et al. | |
| 6,542,883 | B1 * | 4/2003 | Salo | 707/1 |
| 6,609,123 | B1 * | 8/2003 | Cazemier et al. | 707/4 |
| 2001/0013030 | A1 | 8/2001 | Colby et al. | |
| 2003/0088540 | A1 | 5/2003 | Edmunds et al. | |
| 2003/0149571 | A1 | 8/2003 | Francesco et al. | |
| 2003/0204534 | A1 | 10/2003 | Hopeman et al. | |
| 2004/0024790 | A1 | 2/2004 | Everett | |

OTHER PUBLICATIONS

International Search Report, dated Oct. 12, 2006, from related International Application No. PCT/US05/15244.
Written Opinion of the International Searching Authority, dated Oct. 12, 2006, from related International Application No. PCT/US05/15244.
Office Action dated Oct. 6, 2008, received in related U.S. Appl. No. 11/154,259.

* cited by examiner

*Primary Examiner*—Tim T. Vo
*Assistant Examiner*—Garrett Smith
(74) *Attorney, Agent, or Firm*—Townsend and Townsend and Crew LLP

(57) ABSTRACT

Methods and apparatus are described for updating a database using a multi-dimensional data model in which data corresponding to the database are organized in multi-dimensional blocks. Each block has summary information associated therewith corresponding to a current state of evolution of the associated block. Dependency information is maintained in the data model which identifies data dependencies within and among the blocks. Change information is maintained which identifies changes made to particular ones of the blocks and times at which the changes were made. The database is updated with reference to the dependency information, the summary information, and the change information. At least some of the blocks are updated without reference to all dependents thereof. In some implementations, the underlying database may be a relational database, the data from the relational database being mapped to the multi-dimensional data model.

37 Claims, 6 Drawing Sheets

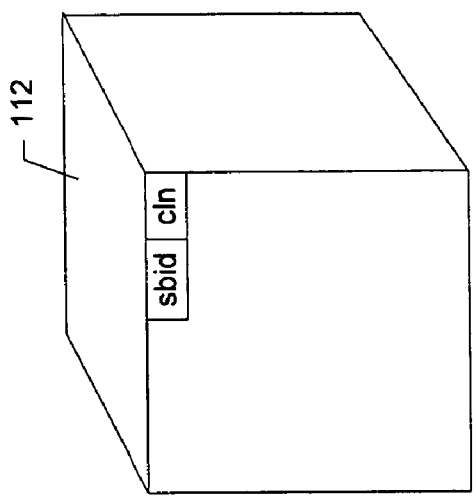
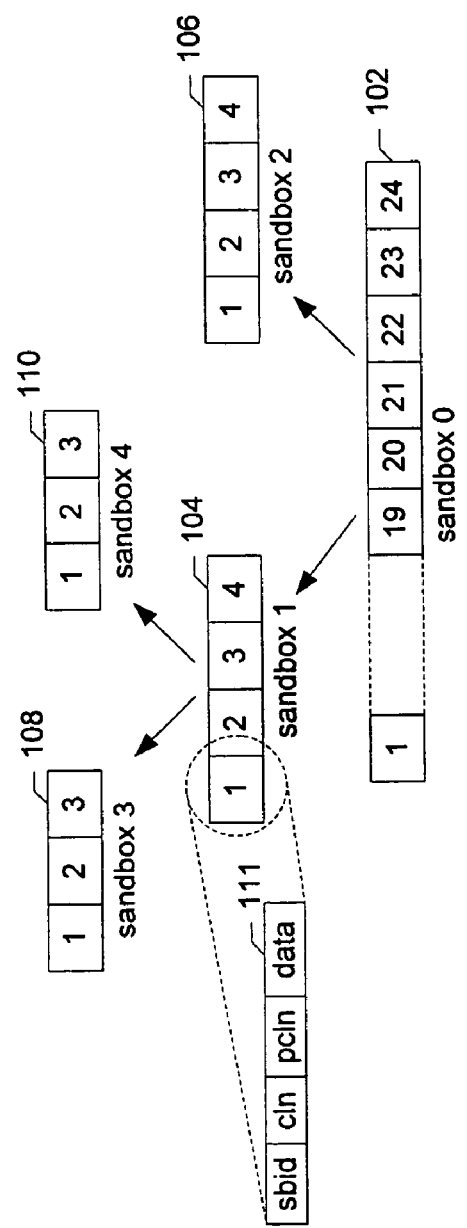
Fig. 1

|  | D11 | D12 | D1 = D11/D12 |
|---|---|---|---|
| D21 | 1 | 2 | 0.5 |
| D22 | 3 | 4 | 0.75 |
| D2=D21+D22 | 4 | 6 | D1=.66<br>D2=1.25 |

Table 1

Fig. 2

|  | D11 | D12 | D1 = D11 + D12 |
|---|---|---|---|
| D21 | 1 | 2 | 3 -> 4 |
| D22 | 3 | 4 | 7 |
| D2=D21+D22 | 4 -> 5 | 6 | 10 |

Table 2

Fig. 3

*Table 3: Block B1 for key (Product: Chair, Location: San Francisco)*

|  | Week 1 | Week 2 | Week 3 | Week 4 | Quarter |
|---|---|---|---|---|---|
| Beginning Inventory | $X1$ | $X2$ | $X3$ | $X4$ | $Q1 = X1 + X2 + X3 + X4$ |
| Receipts | $Y1$ | $Y2$ | $Y3$ | $Y4$ | $Q2 = Y1 + Y2 + Y3 + Y4$ |
| Required | $R1$ | $R2$ | $R3$ | $R4$ | $Q3 = R1 + R2 + R3 + R4$ |
| Ending Inventory | $I1 = (X1+Y1) - R1$ | $I2 = (X2+Y2) - R2$ | $I3 = (X3+Y3) - R3$ | $I4 = (X4+Y4) - R4$ | $Q4 = I1 + I2 + I3 + I4$ |

Fig. 5

*Table 4: Block B2 for key (Product: Chair, Location: Los Angeles)*

|  | Week 1 | Week 2 | Week 3 | Week 4 | Quarter |
|---|---|---|---|---|---|
| Beginning Inventory | $X1$ | $X2$ | $X3$ | $X4$ | $Q1 = X1 + X2 + X3 + X4$ |
| Receipts | $Y1$ | $Y2$ | $Y3$ | $Y4$ | $Q2 = Y1 + Y2 + Y3 + Y4$ |
| Required | $R1$ | $R2$ | $R3$ | $R4$ | $Q3 = R1 + R2 + R3 + R4$ |
| Ending Inventory | $I1 = (X1+Y1) - R1$ | $I2 = (X2+Y2) - R2$ | $I3 = (X3+Y3) - R3$ | $I4 = (X4+Y4) - R4$ | $Q4 = I1 + I2 + I3 + I4$ |

Fig. 6

*Table 5: Block B3 for key (Product: Chair, Location: Western Region)*

|  | Week 1 | Week 2 | Week 3 | Week 4 | Quarter |
|---|---|---|---|---|---|
| Beginning Inventory | $X1 = B1(X1)+B2(X1)$ | $X2 = B1(X1)+B2(X1)$ | $X3 = B1(X1)+B2(X1)$ | $X4 = B1(X1)+B2(X1)$ | $Q1 = X1 + X2 + X3 + X4$ |
| Receipts | $Y1 = B1(X1)+B2(X1)$ | $Y2 = B1(X1)+B2(X1)$ | $Y3 = B1(X1)+B2(X1)$ | $Y4 = B1(X1)+B2(X1)$ | $Q2 = Y1 + Y2 + Y3 + Y4$ |
| Required | $R1 = B1(X1)+B2(X1)$ | $R2 = B1(X1)+B2(X1)$ | $R3 = B1(X1)+B2(X1)$ | $R4 = B1(X1)+B2(X1)$ | $Q3 = R1 + R2 + R3 + R4$ |
| Ending Inventory | $I1 = B1(I1) + B2(I1)$ | $I2 = B1(I2) + B2(I2)$ | $I3 = B1(I3) + B2(I3)$ | $I4 = B1(I4) + B2(I4)$ | $Q4 = I1 + I2 + I3 + I4$ |

Fig. 7

METHODS AND APPARATUS FOR FACILITATING ANALYSIS OF LARGE DATA SETS

BACKGROUND OF THE INVENTION

The present invention relates to techniques for analyzing large data sets and, more specifically, to methods and apparatus for efficiently running "what if" scenarios with large, multi-dimensional data sets.

The term "enterprise software" encompasses a vast array of solutions for manipulation of business data which can be loosely organized into three categories, On-Line Transaction Processing (OLTP), data warehousing, and On-Line Analytical Processing (OLAP). OLTP relates to a class of solutions which facilitate and manage transaction-oriented applications, typically for data entry and retrieval transactions in a number of industries including, for example, banking, airlines, mail order, supermarkets, and manufacturing.

The example of an airline reservation system will serve to illustrate various characteristics of the typical OLTP system. In such a system, there are perhaps thousands of people, i.e., airline passengers, all vying for access to a shared resource, i.e., the reservation system. It is therefore an important goal of any such system that the data stored in the system be readily accessible to ensure a high degree of responsiveness. It is also important to provide locking mechanisms to ensure, for example, that when an individual reserves a resource, e.g., an airline seat, that resource is no longer available to others in the system.

These types of functionalities are typically optimized by storing information in tables which are capable of interacting such as, for example, the tables found in a relational database. In the airline reservation example, one table might correspond to a particular reservation, another table to aircraft type, yet another to flight plans, and yet another to frequent fliers. To effect a particular transaction (e.g., reserving a seat on a particular flight), data are typically read from a number of tables and updated in some subset of those tables in a manner which is typically optimized through the use of indexing and other techniques. In OLTP systems, storing of data in more than one place is disfavored, emphasizing instead a heavy reliance on joint processing of the different tables to combine data.

The manner in which OLTP systems are optimized makes them very effective for real-time transaction processing. However, they are not particularly suited to reporting functions employing aggregate queries, e.g., show all of the people who are flying on a particular flight more than twice a month. On the other hand, the second class of solutions, data warehousing, employs different data schemas, e.g., "star" or "snowflake" schemas, which are better suited to support relatively sophisticated reporting functions.

In a typical data warehousing application, the star or snowflake schema organizes the data around a central "fact" table which is linked to related "dimension" tables. Returning to the airline reservation example, the central fact table might be a reservation which has columns indicating the type of aircraft, whether the passenger is a frequent flier, and the point of origin, the destination and the date of the flight. In addition, there would be dimension tables which include most if not all of the information in the central fact table, e.g., tables for type of aircraft, flight plans, frequent fliers, etc.

It is apparent that in data warehousing systems there may be a tremendous amount of duplication of data. In the OLTP context, this duplication is not acceptable in that, if the date of a particular flight were changed, that piece of data would need to be changed in every reservation table rather than at just a single location. However, this approach to the organization of data is advantageous from a reporting perspective in that it allows the creation and maintenance of summary tables which aggregate information which correspond to queries in which a particular business might be particularly interested, e.g., passenger loads for specific routes by fiscal quarter.

As effective as data warehousing systems are for predetermined queries, they are not particularly well suited for facilitating ad hoc analysis of large data sets. That is, because data warehousing systems are highly optimized to generate static reports, they do not efficiently support analysis of the data in which the questions are not known in advance. For example, a sales manager may look at a static report and see that nation-wide sales of a specific product during a particular month were lower than expected. However, because of the static nature of the report, the reason for the shortfall may not be apparent. In such a situation, the sales manager would like to be able to drill down into the data to determine, for example, whether there are any identifiable disparities (e.g., regional, temporal, etc.) which could serve as an explanation. These types of capabilities are the domain of OLAP.

OLAP systems organize data in multiple dimensions to allow the kind of ad hoc analysis which would allow the sales manager to zero in on the data which might explain the disparity identified in the static report. That is, using an OLAP solution, the sales manager could conduct a directed search which traverses various dimensions in the data before ultimately zeroing in on the detailed data of interest. This is to be contrasted with OLTP solutions which are highly optimized for retrieving detailed data and typically very poor at providing summaries. The OLAP approach is also to be contrasted with data warehousing solutions which would be required to maintain an impracticable number of summary tables to duplicate such functionality.

OLAP systems view data as residing at the intersection of dimensions. That is, the data underlying OLAP systems are organized and stored as a multi-dimensional database (or a modified relational database) which is an instantiation of the cross-product of all of the dimensions. This allows the user to traverse hierarchies of detail along dimensions of interest in an ad hoc manner to get at specific data.

On the other hand, a significant issue with OLAP solutions relates to the fact that they are typically only optimized for batch processing (as opposed to transaction processing which is characterized by near real-time updating). That is, the multi-dimensional "data cubes" which represent the summary data of interest grow geometrically as dimensions are added or expanded. This results in a database which includes vastly more summary data than detailed data. This, in turn, is a significant obstacle to supporting interactive updating of the data. That is, due to the large amount of highly interdependent summary information in the data underlying an OLAP system, the updating of any piece of detailed data tends to be computationally expensive in that many different summaries on many different levels of the hierarchy will typically need to be invalidated and recalculated.

Thus, instead of supporting the interactive updating of data, most OLAP systems typically employ overnight batch recalculations. There are OLAP solutions which attempt to strike various compromises to at least give the appearance of interactive updating. For example, some solutions repeatedly recalculate only the new input values in main memory (rather than the full database) giving the appearance of interactive updating. Other solutions employ scripting techniques to isolate and update subsets of data between batches. Unfortunately, these approaches only partially mitigate the inefficiencies associated with updating multi-dimensional data sets.

In view of the foregoing, it is desirable to provide techniques by which large, complex data sets may be more efficiently invalidated and recalculated to reflect changes.

SUMMARY OF THE INVENTION

According to specific embodiments of the present invention, methods and apparatus are provided for updating a database using a multi-dimensional data model in which data corresponding to the database are organized in multi-dimensional blocks. Each block has summary information associated therewith corresponding to a current state of evolution of the associated block. Dependency information is maintained in the data model which identifies data dependencies within and among the blocks. Change information is maintained which identifies changes made to particular ones of the blocks and times at which the changes were made. The database is updated with reference to the dependency information, the summary information, and the change information. At least some of the blocks are updated without reference to all dependents thereof.

According to some implementations, the database comprises a relational database, and the method further comprises mapping the data from the relational database to the multi-dimensional data model.

According to a specific embodiment, each block corresponds to a subset of a corresponding data cube. According to this embodiment, the changes made to the particular blocks are propagated from at least one cube corresponding to the particular blocks to at least one other cube not including one of the particular blocks.

According to a specific embodiment, at least one computer-readable medium is provided having data stored therein corresponding to a database. The data are organized according to a multi-dimensional data model in which the data are organized in multi-dimensional blocks. Each block has summary information associated therewith corresponding to a current state of evolution of the associated block. The data model further includes dependency information which identifies data dependencies within and among the blocks, and change information which identifies changes made to particular ones of the blocks and times at which the changes were made. The data may be updated with reference to the dependency information, the summary information, and the change information, with at least some of the blocks being updated without reference to all dependents thereof.

According to another specific embodiment, methods and apparatus are provided for running multiple scenarios using data from an underlying database. The data are organized according to a multi-dimensional data model in which the data are organized in multi-dimensional blocks. Each block has summary information associated therewith corresponding to a current state of evolution of the associated block. The data model further includes dependency information which identifies data dependencies within and among the blocks. A first scenario process maintains first change information which identifies first changes made to copies of first ones of the blocks and times at which the first changes were made. The first scenario process facilitates recalculation of the copies of the first blocks and copies of first dependent blocks to incorporate the first changes. A second scenario process run substantially simultaneously with the first scenario process maintains second change information which identifies second changes made to copies of second ones of the blocks and times at which the second changes were made. The second scenario process facilitates recalculation of the copies of the second blocks and copies of second dependent blocks to incorporate the second changes. The first changes are not available to the second scenario process until committed to the underlying database, and the second changes are not available to the first scenario process until committed to the underlying database. The underlying database is then updated with reference to the dependency information, the summary information, and the first change information, thereby making the first changes available to the second scenario process.

A further understanding of the nature and advantages of the present invention may be realized by reference to the remaining portions of the specification and the drawings.

BRIEF DESCRIPTION OF THE DRAWINGS

FIG. 1 is a diagram illustrating multiple "what if" scenarios.

FIG. 2 is a table illustrating the issue of determining calculation order across dimensions.

FIG. 3 is a table illustrating an exemplary calculation.

FIGS. 5-7 are tables illustrating an exemplary data model for use with embodiments of the present invention.

DETAILED DESCRIPTION OF SPECIFIC EMBODIMENTS

Figure 4:
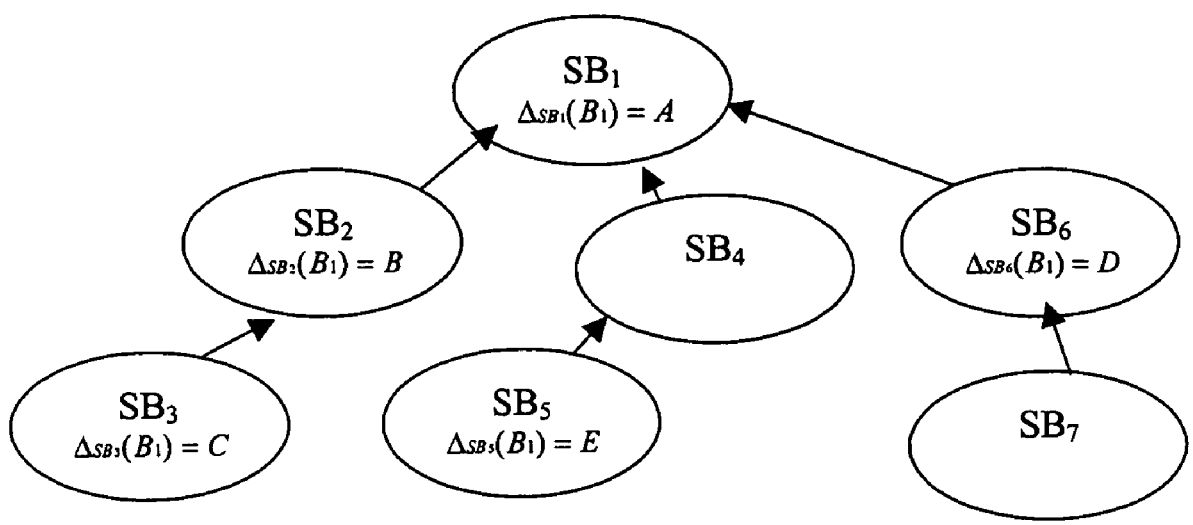
FIG. 4 is another diagram illustrating multiple "what if" scenarios.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention are derived from the insight that, while invalidated summary information in a database is incorrect, the actual deviation from correctness is often relatively minor. Therefore, embodiments of the present invention employ change logging in the maintenance of summary information in large data sets, in combination with dependency checking among data blocks for different levels of hierarchical data in such data sets. This approach results in solutions in which the time required to update or recalculate the underlying data is closer to being a function of the number of changes made rather than, as with most OLAP solutions, a function of the size of the data set or the number of dimensions. It should be noted at the outset that the techniques described herein may be applied whether the underlying data set corresponds to a relational or multi-dimensional data model.

According to a specific embodiment of the invention, a change log is maintained which identifies changes made to particular blocks of data and the times at which the changes were made. A dependency structure is also maintained which represents the dependencies of various blocks in the hierarchy. When running an update or a recalculation, the change log is provided with sufficient information such that all blocks having dependencies related to the changes may be evolved forward to account for the changes. For many operations, blocks can be recalculated simply from the old summary value and the change as opposed to referring to all dependents. This "change-based" approach to updating results in interactive response times even with large and complex data sets.

According to various embodiments, the present invention also enables the running of multiple "what if" scenarios using the same underlying data set substantially simultaneously. These multiple peer scenarios may be run in parallel by different users. Alternatively, a single user may have multiple levels of scenarios, i.e., child scenarios based on the results of a parent scenario. As will be understood, none of this is currently practicable in the conventional OLAP domain, with a typical OLAP solution copying the entire data set for the running of the scenario, and then copying the entire data set back when the user is ready to submit. Such OLAP solutions also need to ensure that no other changes were made to the original data set while the scenario was being run, i.e., locking. Thus, with most OLAP solutions, the running of parallel scenarios is not possible.

By contrast, the change log associated with embodiments of the present invention may be segmented such that each scenario (also referred to herein as a "sandbox") has its own change log, the multiple change logs and the block dependency structure working together to ensure data coherency across the different scenarios. The concept of multiple change logs is illustrated in FIG. 1 in which base change log 102 (corresponding to sandbox 0, i.e., the original underlying data set) includes log entries up to entry 24. Sandboxes 1 and 2 corresponding to change logs 104 and 106 have sandbox 0 as their parent and represent isolated scenarios being run in parallel. Sandbox 1 has two child scenarios, i.e., sandboxes 3 and 4, corresponding to logs 108 and 110. Each entry in a given change log (e.g., entry 111) includes the sandbox ID, the change log number (CLN), the parent sandbox ID, the change log number of the parent sandbox when the child sandbox was created (PCLN), and the change to the data to which the entry corresponds.

According to a specific embodiment, each multi-dimensional block of data (e.g., data cube 112) includes an ID for the corresponding sandbox as well as the change log number to which the current state of evolution of the block corresponds. For example, each block of the original underlying database includes the ID for sandbox 0 and the CLN from the corresponding change log 102. By contrast, a block of data which has been evolved in a particular scenario, e.g., sandbox 1, will include the ID for that sandbox and the CLN from the corresponding change log (e.g., 104). When the user wants to further evolve, i.e., recalculate, a block of data for a particular sandbox, the changes to be applied are derived from the changes indicated in that sandbox's change log as well as the change logs for any parent sandbox and the base sandbox.

So, for example, assume that log entry 2 in change log 108 includes a PCLN value of 3. This means that at the time the change corresponding to log entry 2 was made, the state of the data to which the change was made corresponded to log entry 3 of change log 104. Assuming further that log entry 3 of change log 104 includes a PCLN of 22, everything required to evolve all affected blocks of data to reflect the change is provided. That is, the dependencies identified in the change logs at each level in the hierarchy provide the information necessary to maintain data coherency across multiple, simultaneous scenarios.

According to a specific embodiment, a block recalculation process (calc_CLN) runs in the background of each sandbox to further enhance update efficiency, and to mitigate situations in which the changes to be applied to the data are significant. The block recalculation process periodically accumulates a list of changes, identifies blocks which need to be modified, advances the identified blocks, and then advances a CLN pointer to the sandbox's most recent change log entry. And while it is possible that additional changes may have occurred, the CLN associated with the block recalculation process guarantees that all blocks for which changes were necessary (i.e., blocks having dependencies) have been evolved at least to the CLN indicated.

If, for example, the CLN of a particular block associated with the sandbox is behind the CLN indicated by the block recalculation process, that means that the particular block was not affected by any of the changes up to the later CLN, i.e., the block recalculation process advanced the data without touching that block. Therefore, the only changes which need to be considered are changes made after the CLN to which the block recalculation process is pointing. According to a specific embodiment, the block recalculation process is triggered for a particular sandbox when the number of changes in the sandbox's change log reaches a programmable threshold. This background process serves to reduce the time required for recalculation to the number of blocks affected multiplied by the number of changes, as opposed to the number of existing blocks multiplied by the number of changes.

A change log on any level of the hierarchy may also be segmented according to some dependency grouping, i.e., each log segment is indexed by the things which depend upon it. The segmentation could be determined based on, for example, where the changes are coming from. Segmenting a log based on dependency relationships limits the set of data which needs to be looked at when applying changes forward.

According to a specific embodiment of the invention, to facilitate various of the techniques described herein, a multi-dimensional data model is employed which organizes data in multi-dimensional cubes. A cube is a multi-dimensional data set. Each data element in a cube is a dimensioned element. Dimensions, which may be sparsely or densely populated, define the number of indices that are used to refer to a data element. A cube said to contain n dimensions uses n indices to define the location of a dimensioned element.

The number of elements in the cube is the cardinality of the Cartesian product of each of the dimensions in the cube. Cubes have dimensionality equal to the number of dimensions that define the cube. Each dimension contains members, and the dimension itself is also a member. The number of members in a dimension (including the dimension itself) defines the cardinality of the dimension. The number of data elements in the cube is the product of the cardinality of each dimension in the cube. Sparsely populated or "key" dimensions are used as keys to index sets of values in the densely populated or "block" dimensions. Such cube subsets are referred to herein as "blocks."

It should be noted that this multi-dimensional data model may correspond directly or indirectly to the underlying data set. That is, the underlying data set may be stored in a multi-dimensional database corresponding to the data model described above. Alternatively, the underlying data set may be stored in a multi-dimensional database which corresponds to a different multi-dimensional model, or even as a relational database corresponding to any of a variety of models. In such cases, the underlying database is mapped to a multi-dimensional data model suitable for facilitating the techniques described herein.

According to various specific embodiments, a relational database is employed as the storage model for the underlying data set. The relational database is mapped to the change-based multi-dimensional model described herein to facilitate change-based calculation of data blocks. According to some of these embodiments, data from multiple sources (e.g., relational and/or multi-dimensional sources) may be "mixed" and mapped to the multi-dimensional model described herein.

According to a specific embodiment, calculation functions for a measure within a model (e.g., a cube) may be defined in terms of both other measures local to that model as well as external measures found in other models (e.g., other cubes or relational data sources). When there are references to external sources, a dependency relationship is tracked between the two measures. As with any dependency relationship across measures not found in the same block, a change list entry is generated upon changes to the operand measure. This minimally ensures that the result measure knows that it is invalidated and requires recalculation, and, for most processing, supports a model of change-based calculation from previous summary information. With external sources, an additional step is performed to map the dimensions of the source measure into the dimensionality of the target cube. This step occurs prior to dependency analysis, which can then progress against local cube dimensionality. Note that in the above, there is no requirement that computation of the target happen in a multi-dimensional environment. That is, either source or target may be relational or multi-dimensional. Note also that this approach takes advantage of the ability for multiple models to utilize a single change log to support this.

As mentioned above, to facilitate on-demand calculation of blocks, a dependency structure is maintained which is inherent in the multi-dimensional data set. To manage dependencies, a calculation level is associated with each member. The requirement for calculation levels is that, for each member, the calculation level of each of its operands is less than the members own calculation level. The combination of calculation level (as most significant bits) and member number (as least significant bits) therefore defines a total ordering through the dimension that ensures operands are calculated prior to results.

To generate calculation levels when loading members, the member is loaded and its calculation level is set to one more than the maximum calculation level of its dependents. If a dependent has not yet been loaded, its calculation level is (momentarily) treated as zero. When setting or modifying a calculation level, we also check the list of members dependent upon this member, modifying their calculation level if the invariant does not hold. Applying this algorithm recursively ensures the ordering completes.

While this dependency ordering defines the correct calculation path within a dimension, it does not tell us which calculation path to prefer across dimensions. This can occur both in key dimensions and in block dimensions. An example of the issue is illustrated in Table 1 of FIG. 2. In this example, the user would expect to see the value at (D1,D2) as 0.66, not 1.25. However, it is difficult to algorithmically determine this from anything more than a number of ad-hoc rules which will be wrong at times.

Therefore, according to a specific embodiment, calculation metadata explicitly define a calculation order value for members that can aggregate differently along different paths. In the above example, D1 would be specified as calculation order 1 to ensure it calculates after the other five members. Then, to provide a total cross-dimensional ordering of members, the member combination is used to generate a key containing the maximum calculation order for the members in the combination followed by the calculation level and member number for each member. This total ordering can be used either to create an index of blocks to create for key calculation, or to generate the "program" to compute each cell in a block calculation.

During key calculation, the leaf level cells within a block are aggregated along the appropriate key aggregation path. The mathematical operations supported in key dimensions are those that distribute, e.g., sum, count. Average is computed as a block operation, against sum and count leaf values. Determining the key aggregation path (when there are multiple upper-level members) is done by taking the upper-level member with the largest calculation order.

To compute these values, each child block applied to the block being calculated. The first child block applies in directly. Subsequent operations apply the operator to the value in the child block and the value in the parent block.

Block calculation involves the summarization of input measures and the computation and summarization of derived measures. Block calculation works by executing formulas compiled into a single program. Since block structure is fixed, formula compilation happens in advance at metadata instantiation time. Formulas are applied in calculation order, which falls out of dependency analysis. As each cell is calculated, the result is stored back into the block so it is available as an operand for subsequent calculation instructions. The entire block is calculated with each block calculation.

The user instructs the system on how and what to calculate by defining calculation dependencies, summarization operators, and derived measure formulas. These definitions are translated into executable code. That is, the user's instructions can be thought of as a source program. The resulting executable code is the target program. The compiler is responsible for generating target programs from source programs. A target program consists of a sequence of instructions and a data stack. The data stack provides a convenient way to assemble function arguments and pass back results. According to one embodiment, stack elements are primitive number types and arrays of primitive number types, and the executable instruction set breaks down into two categories: control flow and stack manipulation.

The target program is the set of instructions for computing the values in an entire block. Every cell is computed by evaluating an expression, e.g., d1:=d11+d12. Though most expressions will be translated into an EXECUTE followed by a STORE, more complex expressions may need to be implemented as a sequence of these.

The task of code generation involves the translation of calculation dependencies, summarization operators, and formulas into a set of expressions. It breaks down into parsing, lexical and syntactic analysis, semantic analysis, and code generation steps. The parse and lexical analysis phase is handled by our antlr-based language processor. Semantic analysis is mostly about the mapping of dependency hierarchies and summarization operators into mathematical expressions. Member selection qualification through the application of the cross-dimensional operator will also happen in this phase.

Code generation entails the generation of lvalues (addresses of data locations, which are block offsets) and rvalues (contents of a data locations) and of the application of the appropriate operation or sequence of operations to the rvalues. Note that there is no explicit assignment operator. The occurrence of the next lvalue signals that all of the execution elements have been completed and the value on top of the data stack can be written into the previous lvalue.

Instructions are generated with reference to calculation dependency relationships. Calculation dependencies are modeled by parent-child relationships. For example, the expression d1:=d11+d12+d13, leads to designation of D1 as the parent of each of D11, D12, and D13. The corresponding code generated is as follows:

Lvalue D1
Rvalue D11
Rvalue D12
Rvalue D13
Function SUM

Lvalue coordinates include primary and secondary dimensions. The primary dimension is the one along which summarization is taking place. All of the others are secondary. For input measures, the primary dimension member is the result of a selection of calculation dependency parents from the dependency table sorted in summarization order from least to most summarized. The secondary bits of the coordinate are filled in from a member cross-product generator applied to the secondary dimensions. It will be understood that the foregoing is merely an exemplary description of how a block may be calculated once the change information is propagated according to an embodiment of the According to various specific embodiments, calculation dependencies are specified explicitly as part of the metadata for dimensions. This dependency information, along with summarization operators, leads to a compact roll-up definition. According to one such embodiment, dependencies are specified using the binary depends-on operator, as in member A depends-on member B (or A is a parent of B). Dependency information may be accessed via two data structures: one for testing whether two members depend on one another (for the application of change list entries), and one for determining all of a given member's dependents (for aggregating block data).

Each modification to a data cell creates a change list entry. Application of change list entries from the beginning of time results in the current version of all blocks. An instantiated block on disk has a change list entry associated with it that essentially represents a point in time for the block. To obtain the current version of the block, all change list entries between that point in time and the present are applied.

As discussed above, change lists provide an efficient mechanism to obtain current versions of data blocks without requiring batch calculation. Notably, incremental calculation is a function of the number of changes since the block was last instantiated, not the number of dependent data elements for the block. Change lists also provide a way to set the value of a calculated value to something other than the results of calculating its dependents. This allows support for operations like top-down allocation.

According to a specific embodiment of the invention, a change list entry includes the coordinates of the affected cell, a sandbox id, a change number, the parent sandbox id, the parent sandbox change number, the new value, and the delta from the previously calculated value. The notion of sandboxes is discussed above and will be discussed in greater detail below. The current change list number (CLN) is stored with each sandbox. Each block contains the id of the sandbox it was calculated against as well as the change list number at that time. Within a sandbox, change list entry numbering is a simple incremental numbering using a sequence number. The original, underlying database is designated as sandbox 0.

When creating a change list entry, the current sandbox CLN is incremented, a new entry for this number is created, and the current parent sandbox CLN is associated with it. Associating the parent sandbox CLN makes it possible to apply any change list entries for any ancestor sandboxes. Associating the parent CLN facilitates traversing through any ancestors and determining what changes need to be applied for each. Alternatively, each of the sandbox CLNs could be stored in the block itself.

The new data value is stored in all cases. The delta from the previous data value is stored when it is a sum or aggregation path value. This occurs when the data value is a leaf-level value along block dimensions, and has sum or count as its aggregation operator along the key dimensions (although it will be understood that aggregation operators are not limited to sum or count). After the change list entry is created, the delta value is adjusted for all dependent change list entries. This is accomplished by filtering for change list entries that have a delta value set, are for the corresponding sandbox or its descendants, and where the members have this member as a dependent.

Embodiments of the present invention provide the capability to build multiple cube structures "on top" of a single change log such that changes in any of the cubes can be efficiently propagated to any of the other cubes. That is, embodiments of the present invention allow dependencies to be defined between members within the same cube and between members in different cubes. Thus, when a block is retrieved from memory, it can be determined with reference to the dependency structure inherent in the data model and with reference to the change log whether a value change in another cube affects any values in this block. In addition, the dependency structure and the change log provide the necessary information to facilitate the transformation of the change information from one cube to another so that the change may be applied in accordance with the dependency. As discussed herein, this may be done whether the underlying data source (s) is relational or multi-dimensional.

An example, may be instructive. Assume that in a particular solution, the data model includes a demand cube, a schedule cube, a supply cube and a cost cube. A change is made to the demand cube relating to the forecast for a particular product. The change is made at the month level of a fiscal calendar and for a specific geographic region. The schedule cube includes a manufacturing calendar which goes down to the week level and organizes products by assembly line. The present invention allows the change to the demand cube to be propagated to the manufacturing cube for constraint checking, i.e., to determine whether sufficient quantities of the product are scheduled to be manufactured to support the changed demand forecast. Then, as corresponding changes are made to the manufacturing schedules for particular assembly lines, these changes are propagated to the supply cube in which the changes are reflected down to the level of individual parts for the products being manufactured. Changes to the supply cube will, in turn, affect inventory costs which are tracked in the cost cube. This example illustrates how changes may be cascaded and transformed through multiple cubes using the dependency structure and change log of the present invention. Such changes may be propagated automatically or, alternatively, may cause exceptions requiring user intervention.

As mentioned above, the techniques of the present invention may be applied in cases in which the source and target data correspond to different data models. That is, for example, the source data being changed may correspond to a relational data model while the target data affected correspond to a multi-dimensional model, or vice versa. In a specific example, when the date of a purchase order in a relational purchase order table is changed, the change is recorded in the change log of the present invention. The change log entry may then be used to change the aggregate on-order quantity for the weeks corresponding to the original and new dates, the aggregate on-order quantity being stored according to a multi-dimensional data model.

A specific embodiment of on-demand block calculation will now be described. The calculation includes instantiating a block, applying key change list entries, performing a block calculation, and applying block change list entries. According to a specific embodiment, block instantiation involves finding the version of a block that requires the fewest change list entries to be applied to it to generate a current version. When a block is requested, the cache returns the block requiring the fewest changes which, in some cases, may be a block for a parent sandbox even if an entry exists in cache for the current sandbox.

If the block is not found in cache, a query is issued that retrieves all the disk-stored versions of the block with the requesting sandbox id or an ancestor id, reverse sorted by sandbox number. The first block returned is then taken as a source since the database operations likely exceed the cost of change application.

It is possible that no blocks exist on disk, in which case the block is instantiated with no values, and the CLN is set to the CLN of the last batch block recalculation process (calc_CLN). This case implies that, as of the last batch calculation, there were no values instantiating this block.

Once a candidate block is retrieved, the list of change list entries that need to be applied to the block is determined. First, the subset of change list entries associated with the current sandbox or one of its ancestors, and for which the corresponding CLN is greater than any of those applied to the candidate block are retrieved. The sandbox id and parent CLN can be used recursively to generate values against which to compare for ancestor sandboxes. If the sandbox of the block is an ancestor of the current sandbox, all entries for sandboxes between the block sandbox and the current sandbox must be applied.

Second, only change list entries for dependent entries for the block being calculated are applied. Entries must satisfy one of two conditions to be included—either they are for a child cell that is used to compute a cell in the block (e.g., leaf-level in block dimensions and a dependent value along all key dimensions), or they can be for any cell in the block itself (i.e., key dimensions match).

In addition to simple dependency, we also need to ensure that the change list entry is for a cell that would be accumulated into this block based on the calculation order. For the block dimensions, a bitmap of leaf-level members is maintained, and it is ensured that the member is leaf-level along all block dimensions. All of these entries are applied prior to a block calculation. So, for example, if the calculation uses sum, the delta value for the entry is added to the cell. As another example, if the calculation uses count, an adjustment could be made from "value" to "no value," or vice versa.

For entries within the block itself, all of these are applied directly into the block using the new cell value, and block calculation. Block calculation needs to ensure that it does not overwrite any cells that have had their value explicitly set (rather than calculated). This also ensures that parents of such cells are calculated based on the user-specified value, not a possibly-different calculated value.

According to a specific embodiment, the dependency structure is a bitmap relationship between source and target dimensions. Two forms of dependency relationships are maintained—direct dependencies and indirect dependencies.

Direct dependencies are primarily used to generate indirect dependencies. A bitmap provides a constant-time mechanism to establish dependency between a change list entry and a block using only space linear in the number of members in a dimension. The dependency relationship is generated by taking the operand dependencies for a member in a dimension (i.e., the direct map), and logically OR'ing them into an indirect map. Efficient and correct batch calculation is facilitated by calculating operands prior to the members that depend on them. This can be ensured by using the dependency relationship to construct a total ordering of members in the cube. This can be done by traversing the dependency hierarchy to establish calculation levels to define a partial ordering and then numbering the members such that the partial ordering is satisfied.

According to a specific embodiment, the present invention supports allowing users to update dependent values, correcting change list entries as necessary to account for the change. So, for example, if a user changes a value in a sandbox, all computations in that sandbox and all levels in the hierarchy above that sandbox will use the new value. However, in the sandbox in which the change occurred, the value will be identified as inconsistent with the underlying data (e.g., it will show up as a red cell), until the underlying data are reconciled with the change.

According to various embodiments, the block calculation infrastructure of the present invention supports updates to upper-level members. Such embodiments include rules for calculating members dependent on these values when they do not reconcile with their children. Consider the case illustrated in Table 2 of FIG. 3.

If (D11,D2) are updated to 5 and (D1,D21) to 4, should the value of (D1,D2) be 10, 11, or 12? Because change list application should be no different than batch calculation, aggregation is done along one dimension, not both, so the value should be 11. More specifically, changes to input level nodes along a key aggregation path are only included if that is the path that would be followed. So, for example, if aggregation occurs along D2 rather than D1, if (D1, D21) were changed, it would not affect the value of (D1,D2).

Changes to upper-level block members are not applied unless they apply to the block being calculated. This is because upper-level block values are calculated from their input values along the block dimension, not accumulated along the key ones. Therefore, no change to an upper-level block value could affect any block other than itself.

One issue with on-demand calculation is the potential that a large number of change list entries may need to be applied to a block. Therefore, specific embodiments of the invention provide a periodic background calculation to avoid the change list from growing to an unreasonable size. The background calculation is not allowed to block other requests going on in the system. The same locking rules apply for calculation in the background as apply to user update operations in the foreground.

According to a specific embodiment, the background calculation thread "wakes up" periodically (e.g., after some programmable period of time) and determines whether there are any other requests active in the system. If so, it will go inactive. If not, it will calculate a programmable number of blocks and loop to see if there are any other requests waiting. These block calculations are committed each period.

According to some embodiments, the background calculation employs the change list model employed during on-demand calculation. According to a specific embodiment, the change list entries are used to identify the blocks that require calculation which are placed in a background calculation work table. This work table is traversed in key calculation order, with a key calculation being performed for each block. If a block in the list is changed after calculation, entries are inserted in the work table for all blocks that are parents of that block. The block's work table entry is then deleted and the new block written out. After each complete traversal of a block, the CLN from which the traversal began is updated.

As discussed above, embodiments of the present invention support multiple scenario "what-if" analysis of an underlying multi-dimensional data. Each scenario is supported through the notion of a sandbox. The underlying data are organized in terms of cubes and blocks. The multiple dimensions are divided into key and block categories. Each combination of values from key dimensions form a key, and all possible values from the block dimensions corresponding to each "key" resulting from values of the key dimensions is organized as a block. The blocks are fetched for calculation using the block key.

Sandboxes may be used to facilitate impact analysis and collaboration. For example, a marketing analyst can use a sandbox for a what-if analysis on forecast changes, while a production planner simultaneously uses a sandbox to compose a solution for a broken constraint. The system keeps the sandbox changes in a parallel persistent data store without affecting the production data. Participants in unrelated sandboxes do not see changes in progress in other sandboxes. However, changes committed to the enterprise system are visible in all sandboxes. A sandbox can be viewed by a single person or shared by a group of people.

As discussed above, according to some embodiments, sandboxes can be hierarchical, i.e., one or more "child" sandboxes can be created within a "parent" sandbox. Participants in a child sandbox have access to changes in the parent sandbox. For example, a master scheduler can create a sandbox and invite the shop floor manager to participate. The shop floor manager can create her own sandbox within the master scheduler's sandbox to explore production issues. A child sandbox can also be shared for collaboration. Internally, a child sandbox creates another parallel data store on top of the parent sandbox.

As discussed above, an important characteristic of various embodiments of the invention is the support for updates of blocks, including different updates to the same block in different scenarios. An exemplary hierarchy of sandboxes is shown in FIG. 4. The sandbox SB1 is the base sandbox with three children SB2, SB4, and SB6, each of which has a child of its own. The figure also shows that there are changes happening to block B1 in some of the sandboxes. The value of block B1 in the underlying database is referred to herein as DB. The deltas to block B1 are identified in each of the sandboxes in which changes to B1 were made.

In the example shown, block B1 as seen in SB3 will have a value of (B1 in DB+A+B+C), and the block B1 as seen in SB2 will have a value of (B1 in DB+A+B). When SB7 and SB6 complete and fold their changes to the base sandbox, the changes to block B1 in SB1 becomes (A+D). The block B1 as seen in SB3 will then have a value of (B1 in DB+A+D+B+C). Similarly the block B1 as seen in SB2 will have a value of (B1 in DB+A+D+B).

If there are conflicting changes to the block, the value in a child sandbox will override that of the parent. For example, in the above figure if there are conflicting changes in sets B and C above, then the change in set C will override that of the set B. As a result, the sandbox SB3 will continue to see its change over any changes made elsewhere.

A child sandbox sees uncommitted changes made in the parent sandbox, e.g., if a change is made to block B1 in SB2, it is reflected in SB3. However, the changes in sibling sandboxes, e.g., SB2 and SB4 are not visible to each other. Neither are child sandbox changes visible to the parent.

A parent cannot commit its changes before its child sandbox commits its changes. That is, each sandbox exists in a context, and semantically it doesn't make sense for a sandbox to exist without its context. So, changes from the child sandbox must be folded to its parent, with the process moving recursively upward. This implies that the only changes that can trickle down to the child sandboxes are the changes from sandboxes that are not direct ancestors.

According to some embodiments, a sandbox may last much longer than the user interface session during which it is created. This is supported through the notion of long running transaction. According to such embodiments, there is no need to commit changes made in a sandbox to the parent sandbox at the end of the session. One or several users could work on the same sandbox for a long period of time through multiple different sessions before its changes were committed and folded into its parent sandbox.

An exemplary data model will now be employed to illustrate the operation of a specific embodiment of the invention. The model includes a cube having four dimensions; product, location, attribute or measure, and time. The product and location dimensions are sparsely populated, and the attribute and time dimensions are densely populated.

Tables 3, 4 and 5 of FIGS. 5, 6 and 7, respectively, describe three blocks in the model. Each block is identified uniquely by the values from two key dimensions, i.e., product and location, and contains values from the remaining two block dimensions. In this example, block B1 has five time values and four attribute or measure values forming a block of twenty values. The key for the block is (chair, San Francisco), i.e., the values from the key dimensions of production and location. As shown, the values of the block dimensions of the block may have different characteristics, i.e., some are input values, some are derived or calculated from other values within the same block, and some are derived based on values from other blocks (called key summarization or rollup).

For example, the values for measures beginning inventory, receipts and required for time periods week 1, week 2, week 3 and week 4 for blocks B1 and B2 are all input values. The values for measures ending inventory for every week and also for the quarter time-period for the blocks B1, B2 and B3 are derived values, and are dependent solely on the values from within the same block. The values for measures beginning inventory, receipts and required for time periods week 1, week 2, week 3 and week 4 for block B1 are dependent on the values from blocks B1 and B2, i.e., these values summarize from the dependent values.

The framework of the present invention also supports updating of a derived value whether it is derived from within a block or from across blocks. For example, the values for measure ending inventory for week 1 in block B1 could be changed by the end user. Similarly, the values for measure beginning inventory for week 3 in block B3 could also be changed by the end user. We will discuss how this change is handled.

The updates and the support of different views for blocks in different sandboxes are handled by augmenting the different data structures (block, sandbox, etc.) with an entity called "changelist number" (CLN). The absolute values as well as the relative values of this CLN in different data structures facilitates efficient updating as well as the propagation of updates through different sandboxes.

The changelist number is a monotonically increasing number and is incremented each time a change is made to a cell in a block in a sandbox. Each sandbox has a different counter, and its changelist number start from zero. Each user level change is reflected using a changelist entry (CLE). The changelist entry includes information about the cell coordinates, the new value, the old value as well as the delta. The changelist entry may result in generation of many new changelist entries. For example, in the sample model, if measure beginning inventory for week 1 is changed for block B1, then a CLE is generated for that change as well as the changes for the following values: Q1 for block B1; I1 for block B1; X1 for block B3. The values I1 and Q1 also change for block B3, CLE's are not generated for that. The block B3 is re-calculated because of change of value of X1 and hence there is no need for CLE's for I1 and Q1 value change.

There is no need to store derived values in disk that are completely based on values from the same block. This is called "dynamic calculation" and is supported in specific embodiments. According to such embodiments, there is no need to generate CLE's for these derived values as they will be recomputed when the block is fetched from disk.

When a user level change is made, it may cascade to many other changes. An important question to ask is whether all the affected blocks will be fetched. According to a specific embodiment, the following approach is employed. If a change is made in a block by a user input, then that block is fetched. IN addition, all the blocks that are shown in the user interface are fetched. If user interface is focused along certain hierarchy that shows the summarization of a block value along key dimensions, then all those blocks are fetched. If a change is made that impacts the blocks visible on UI, then the blocks are fetched and made current. Also the CLE's generated for these blocks because of a user change in this sandbox are applied. Finally, if a dependency of blocks is conditional, then when CLE's are generated, those blocks are fetched.

How does a block look inside a sandbox? If all the changes to the block from the beginning of time to the latest changelist number are applied in an "appropriate" order (ordering may not be in the increasing order of changelist number), then the latest version of that block will be derived. According to a specific embodiment, the blocks that have been changed in a sandbox are stored as a separate copy for that sandbox. This avoids having to apply all the historical changes again to get the copy of the block.

The notion of a block being made "current" and the propagation of changes to other sandboxes according to various embodiments of the invention will now be described. In this discussion, the abstraction of a "block touch" will be employed. This phrase refers to the fact that when a block is touched then it is "current" with respect to changes in other sandboxes, and changes in the current sandbox. When a block in a particular sandbox is made "current," the block is updated in the database with all the latest changes, and the block is fetched into cache with all the changes.

The notion of "touching" a block according to a specific embodiment of the invention will now be described. Each block for a given sandbox, stores a CLN. The property of the CLN is that the block is current with respect to all the changes up to the CLN. The sandbox for a block stores the last changelist number of a CLE that was generated in that sandbox. If the block CLN is less than the sandbox CLN, there may be CLE's that need to be applied to the block. The database is then searched for the list CLE's that are applicable, and these are then applied to the block. The CLN of the block is then advanced to that of the sandbox.

With respect to changes from other sandboxes, additional information is needed. As described above, each sandbox stores a CLN that reflects the CLN of the latest CLE in the sandbox. Each sandbox also stores the identifier of the parent sandbox. In this way, a tree structure is maintained. Each sandbox also stores the CLN of the parent sandbox at the time of its creation. This value of parent sandbox CLN is used to determine whether any changes to any block in the sandbox need to be applied.

When the changes for a particular sandbox are submitted, copies are created of all the CLE's for that sandbox and stored as the CLE's for the parent sandbox. The CLN's of the parent and descendant sandboxes are also updated by 1. This triggers a check as to whether there are any pending changes in the parent and in the sandbox. For example, referring back to FIG. 4, when SB6 is submitted (assume SB7 was submitted into SB6 sometime back), the CLN's of SB1, SB2, SB3, SB4, and SB5 are each increased by one. This guarantees that the parent CLN stored in SB2 will be different from the current CLN of SB1, thereby triggering a further check.

Consider a block in SB3 that has been recently touched before the submission of SB6. After the touch, the CLN of that block and that of SB3 will be same. Then, after the submission of SB6, when the same block is fetched again in SB3, another check determines whether the block CLN is same as that of SB3. Because of the increment described above, it is different. An additional check determines whether the parent CLN stored in SB3 is same as the current CLN of SB2. That is different as well. So, the ancestor hierarchy is traversed all the way to base sandbox (SB1 in this case) to identify all the applicable CLE's for the block under consideration. The CLN of the block is then advanced to that of SB3. Similarly all the other blocks in SB3 when they are fetched or touched, will go through the similar process and become current.

As discussed above, sandboxes are linked using the parent identifier and also the value of parent CLN at the time of creation of the sandbox. In addition, storing the block CLN and sandbox CLN allows efficient updating of a block. According to a particular embodiment, the changing of derived values is also supported.

Consider Table 5 which includes derived values from block B3. Suppose the current value of the beginning inventory measure for week 1 (B3(X1)=B1(X)+B2(X1)) is 130 units, and suppose the user changes the value to 150 units. Now there is a difference of 20 units and it introduces a constraint violation, where the operands do not sum up. This change needs to be maintained along with the constraint violation. When the user changes one of the operand values, e.g., B1(X1), making the actual sum 145 units, then the difference causes the constraint violation to becomes 5 units instead of 20 units.

According to various embodiments, the following types of CLE entries are maintained: (1) User CLE—reflects a user level change to an input variable; (2) Derived CLE—reflects a user level change to a derived variable which otherwise would be summarized using other variables; (3) Compound CLE—not a user level change but rather a change resulting from cascading a user level change; and (4) Dummy CLE—reflects an artificial change to indicate that a sandbox has submitted its changes to one of the ancestor sandboxes. These different types of entries are tracked for appropriate checks.

There is also a notion of the update level of a CLE. This is to keep track of the precedence of changes and to help prevent some types of changes from happening in the system. According to one embodiment, there are three update levels: (1) Calculation update—has the least precedence; (2) User update—has precedence over calculation implying that user can override calculation update; and (3) System update—has precedence over user level changes. This is to enforce certain "auto propagation" constraints in the system.

As discussed above, some embodiments employ a "calc_CLN" as process to ensure that changes are properly and efficiently propagated throughout the hierarchy. According to specific ones of these embodiments, the calc_CLN operates using three mechanisms: (1) a batch calculation that happens during load, (2) a time-range shift, and (3) a background calculation that makes all blocks current. The batch calculation is not CLE based and it simply calculates all candidate blocks to the current values. It then advances the calc CLN. The background calculation is CLE based, and it also makes all blocks current. The idea is to make sure by using free CPU cycles to do the work of making blocks current, the foreground interactive process will have less work to do, and will fetch blocks much faster.

Figure 8:
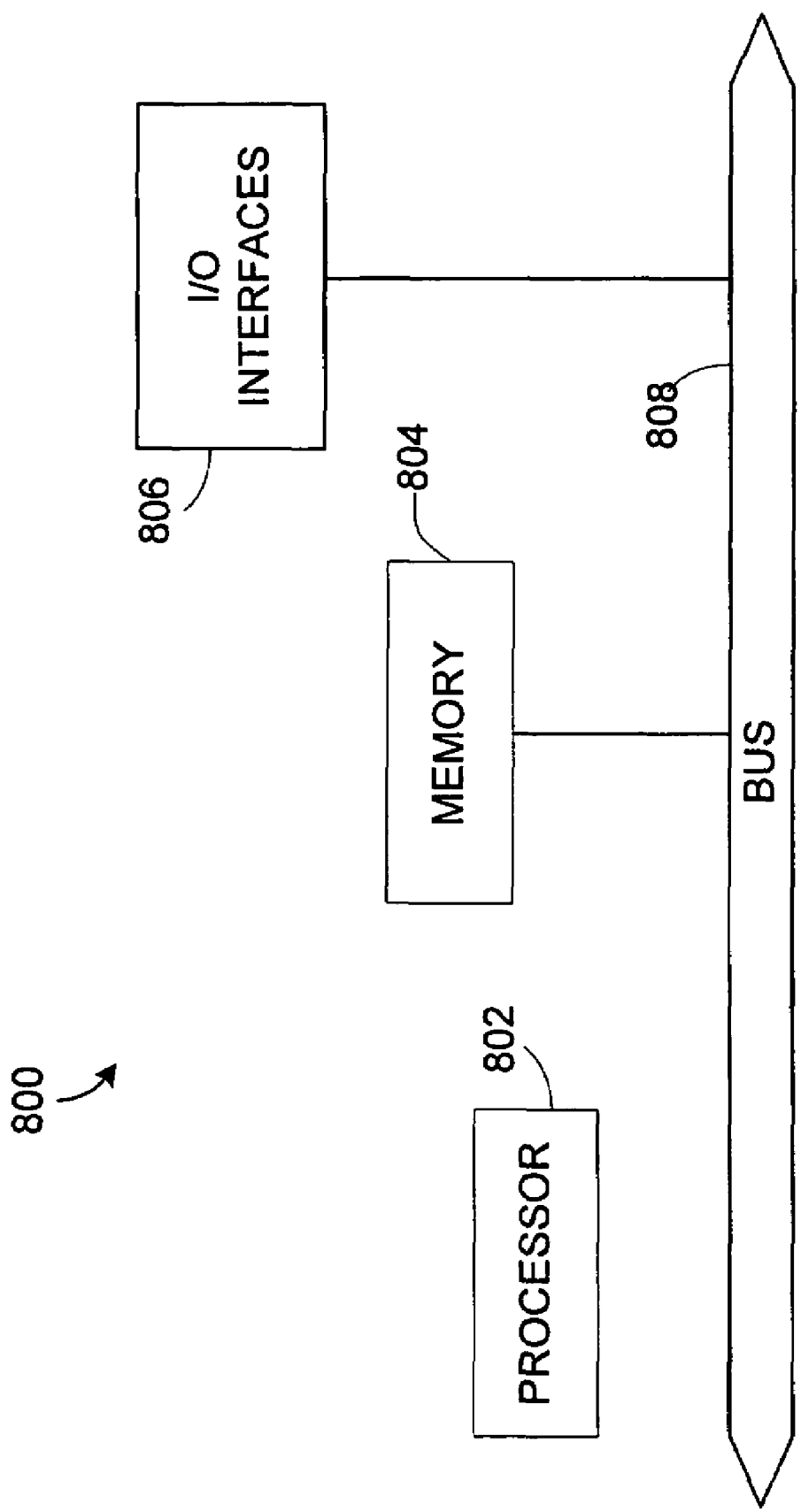
FIG. 8 is a diagrammatic representation of an exemplary computing device which may be employed to implement aspects of various embodiments of the present invention.

Referring now to FIG. 8, a computer system 800 suitable for implementing various aspects of the present invention is depicted. Computer system 800 includes one or more central processing units (CPUs) 802, one or more blocks of memory 804, input and output interfaces 806, and a bus 808 (e.g., a PCI bus). Alternatively, computer systems employing point-to-point infrastructures instead of buses may also be employed. When acting under the control of appropriate software or firmware, CPU 802 is responsible for implementing various portions of the techniques of the present invention. It preferably accomplishes all these functions under the control of software including an operating system and any appropriate applications software. CPU 802 may include one or more processors. In a specific embodiment, some portion of memory 804 (such as non-volatile RAM and/or ROM) also forms part of CPU 802. However, there are many different ways in which memory could be coupled to the system. Memory block 804 may be used for a variety of purposes such as, for example, caching and/or storing data, program code, etc.

The input and output interfaces 806 typically provide an interface to various I/O devices, such as mouse, keyboard, display, as well as providing a communication interface with other computer systems over a computer network. Among the communication interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

It will be understood that the system shown in FIG. 8 is an exemplary computer system and is by no means the only system architecture on which the various aspects of the present invention can be implemented.

Regardless of system's configuration, it may employ one or more memories or memory modules (such as, for example, memory block 804) configured to store data, program instructions for the general-purpose network operations and/or the inventive techniques described herein. The program instructions may control the operation of an operating system and/or one or more applications, for example. The memory or memories may also be configured to store information in a repository directory.

Because such information and program instructions may be employed to implement the systems/methods described herein, the present invention also relates to machine or computer-readable media that include databases, program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, embodiments of the invention have been described herein with reference to a multi-dimensional data model. It will be understood that this data model may be imposed on any of a variety of underlying data sets. For example, the techniques described herein may be applied to either multi-dimensional or relational databases which have been mapped to the multi-dimensional data model described herein. Alternatively, other data models having similar characteristics to the multi-dimensional data model described herein may be employed.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for updating a database using a multi-dimensional data model in which data corresponding to the database are organized in multi-dimensional blocks, each block having summary information associated therewith corresponding to a current state of evolution of the associated block, the method comprising:

maintaining dependency information in the data model which identifies data dependencies within and among the blocks;

maintaining a temporally sequential log of change information which identifies first changes and second changes made to particular ones of the blocks and times at which the changes were made wherein the change information comprises a list of change list entries, each change list entry comprising a change list number and identifying one of the changes and wherein the summary information associated with each block comprises one of the change list numbers which corresponds to the current state of evolution of the block; and updating the database with reference to the dependency information, the summary information, and the change information wherein updating includes determining a sequence in which the first changes and the second changes were committed to the underlying database based on the temporally sequential change information, applying the change information to the database in order of the determined sequence, including generating a dependency list of data changes whose data depends directly or indirectly from the prior changed data changes, and processing the data changes in the dependency list in accordance with a dependency update algorithm to update the data changes in the dependency list.

2. The method of claim 1 wherein updating the database comprises updating the particular blocks and at least some of the blocks dependent on the particular blocks.

3. The method of claim 2 wherein updating the database comprises updating less than all of the dependent blocks.

4. The method of claim 3 further comprising determining which of the dependent blocks to update.

5. The method of claim 4 wherein determining which of the dependent blocks to update is done with reference to representations of the dependent blocks in a user interface.

6. The method of claim 3 further comprising updating remaining dependent blocks at a later time.

7. The method of claim 6 wherein updating the remaining dependent blocks comprises updating the remaining dependent blocks with a scheduled batch process.

8. The method of clam 6 wherein updating the remaining dependent blocks comprises updating the remaining dependent blocks with a periodic background process.

9. The method of claim 1 further comprising running at least one scenario process in a sandbox with which copies of the particular blocks and copies of blocks dependent on the particular blocks are associated, the method further comprising updating the copies of the particular blocks and copies of at least some of the dependent blocks.

10. The method of claim 9 wherein updating the database comprises submitting scenario changes associated with each of the at least one scenario process to the database.

11. The method of claim 9 wherein the at least one scenario process comprises a plurality of scenario processes, the scenario changes associated with peer scenario processes not being available to other peer scenario processes until submitted to the database.

12. The method of claim 11 wherein the plurality of scenario processes are organized in a hierarchy of parent and child scenario processes, the scenario changes associated with parent scenario process being made available to related child scenario processes.

13. The method of claim 11 wherein the change information is segmented such that a portion of the change information is associated with each of the scenario processes.

14. The method of claim 9 wherein committed changes to the database are made available to the at least one scenario process when the database is updated.

15. The method of claim 9 wherein each of the at least one scenario process has a block recalculation process associated therewith running as a background process by which a subset of the dependent blocks may be updated.

16. The method of claim 1 wherein each block comprises a plurality of data elements and plurality of dimensions by which the data elements are indexed, each dimension having a plurality of members defining the cardinality of the dimension, the cross product of the cardinalities of the dimensions of a specific block being the number of data elements in the specific block.

17. The method of claim 16 wherein the dependency information comprises a calculation level hierarchy among dependent ones of the members which ensures that operands are calculated in order.

18. The method of claim 1 wherein each block comprises a plurality of data elements and plurality of dimensions by which the data elements are indexed, the method further comprising transforming changes to a first block from a first one of the dimensions in the first block to a second one of the dimensions in a second block with reference to the dependency information.

19. The method of claim 1 wherein the database comprises a relational database, the method further comprising mapping the data from the relational database to the multi-dimensional data model.

20. The method of claim 1 wherein the database comprises a multi-dimensional database corresponding to the multi-dimensional data model.

21. The method of claim 1 wherein the database comprises a multi-dimensional database which does not correspond to the multi-dimensional data model, the method further comprising mapping the data from the multi-dimensional database to the multi-dimensional data model.

22. The method of claim 1 wherein each block corresponds to a subset of a corresponding data cube, and wherein updating the database comprises propagating the changes made to the particular blocks from at least one cube corresponding to the particular blocks to at least one other cube not including one of the particular blocks.

23. A computer-implemented method for running multiple scenarios using data from an underlying database, the data being organized according to a multi-dimensional data model in which the data are organized in multi-dimensional blocks, each block having summary information associated therewith corresponding to a current state of evolution of the associated block, the data model further comprising dependency information which identifies data dependencies within and among the blocks, the method comprising:

running a first scenario process in a first sandbox, the first scenario process maintaining first temporally sequential change information which identifies first changes made to copies of the first ones of the blocks and times at which the first changes were made, the first scenario process facilitating recalculation of the copies of the first blocks and copies of first dependent blocks to incorporate the first changes wherein the first temporally sequential change information comprises a list of change list entries, each change list entry comprising a change list number and identifying one of the changes and wherein the summary information associated with each block comprises one of the change list numbers which corresponds to the current state of evolution of the block;

running a second scenario process substantially simultaneously with the first scenario process in a second sandbox, the second scenario process maintaining second temporally sequential change information which identifies second changes made to copies of second ones of the blocks and times at which the second changes were made, the second scenario process facilitating recalculation of the copies of the second blocks and copies of second dependent blocks to incorporate the second changes wherein the second temporally sequential change information comprises a list of change list entries, each change list entry comprising a change list number and identifying one of the changes and wherein the summary information associated with each block comprises one of the change list numbers which corresponds to the current state of evolution of the block;

wherein the first changes are not available to the second scenario process until committed to the underlying database, and wherein the second changes are not available to the first scenario process until committed to the underlying database; and updating the underlying database with reference to the dependency information, the summary information, and the first temporally sequential change information, thereby making the first changes available to the second scenario process wherein updating includes determining a sequence in which the first changes and the second changes were committed to the underlying database based on the temporally sequential change information, applying the change information to the database in order of the determined sequence, including generating a dependency list of data changes whose data depends directly or indirectly from the prior changed data changes, and processing the data changes in the dependency list in accordance with a dependency update algorithm to update the data changes in the dependency list.

24. The method of claim 23 further comprising running a third scenario process substantially simultaneously with the first and second scenario processes in a third sandbox, the third scenario process maintaining third temporally sequential change information which identifies third changes made to copies of the third ones of the blocks and times at which the third changes were made, the third scenario process facilitating recalculation of the copies of the third blocks and copies of third dependent blocks to incorporate the third changes wherein the third temporally sequential change information comprises a list of change list entries, each change list entry comprising a change list number and identifying one of the changes and wherein the summary information associated with each block comprises one of the change list numbers which corresponds to the current state of evolution of the block, the third scenario process being a child of the first scenario process, the first changes being available to the third scenario process before the first changes are committed to the underlying database.

25. The method of claim 24 further comprising running a fourth scenario process substantially simultaneously with the third scenario process in a fourth sandbox, the fourth scenario process maintaining third temporally sequential change information which identifies fourth changes made to copies of the fourth ones of the blocks and times at which the fourth changes were made, the fourth scenario process facilitating recalculation of the copies of the fourth blocks and copies of fourth dependent blocks to incorporate the fourth changes wherein the fourth temporally sequential change information comprises a list of change list entries, each change list entry comprising a change list number and identifying one of the changes and wherein the summary information associated with each block comprises one of the change list numbers which corresponds to the current state of evolution of the block, the fourth scenario process also being a child of the first scenario process, the first changes also being available to the fourth scenario process before the first changes are committed to the underlying database, wherein third changes associated with the third scenario process are not available to the fourth scenario process until committed to the copies of the blocks associated with the first scenario process or the underlying database, and wherein fourth changes associated with the fourth scenario process are not available to the third scenario process until committed to the copies of the blocks associated with the first scenario process or the underlying database.

26. The method of claim 24 further comprising running a fourth scenario process substantially simultaneously with the third scenario process in a fourth sandbox, the fourth scenario process maintaining fourth temporally sequential change information which identifies fourth changes made to copies of the fourth ones of the blocks and times at which the fourth changes were made, the fourth scenario process facilitating recalculation of the copies of the fourth blocks and copies of fourth dependent blocks to incorporate the fourth changes wherein the fourth temporally sequential change information comprises a list of change list entries, each change list entry comprising a change list number and identifying one of the changes and wherein the summary information associated with each block comprises one of the change list numbers which corresponds to the current state of evolution of the block, the fourth scenario process being a child of the third scenario process, the first changes being available to the fourth scenario process before the first changes are committed to the underlying database, and third changes associated with the third scenario process being available to the fourth scenario process before the third changes are committed to the copies of the blocks associated with the first scenario process or the underlying database.

27. The method of claim 23 further comprising maintaining global change information which identifies changes made to particular ones of the bocks in the underlying database and times at which the changes were made; and
updating the database with reference to the dependency information, the summary information, and the global change information, at least some of the blocks being updated without reference to all dependents thereof.

28. The method of claim 27 wherein the first change information and the second change information comprise subsets of the global change information when the first and second changes have been committed to the underlying database.

29. The method of claim 23 wherein each block comprises a plurality of data elements and plurality of dimensions by which the data elements are indexed, each dimension having a plurality of members defining the cardinality of the dimensions, the cross product of the cardinalities of the dimensions of a specific block being the number of data elements in the specific block.

30. The method of claim 29 wherein the dependency information comprises a calculation level hierarchy among dependent ones of the members which ensures the operands are calculated in order.

31. The method of claim 23 wherein each block comprises a plurality of data elements and plurality of dimensions by which the data elements are indexed, the method further comprising transforming any of the first and second changes from a first one of the dimensions in a first block to a second one of the dimensions in a second block with reference to the dependency information.

32. The method of claim 23 further comprising updating the underlying database with reference to the dependency information, the summary information, and the second change information, thereby making the second changes available to the first scenario process.

33. The method of claim 23 wherein the first and second scenario processes are included in a hierarchy of scenario processes, the method further comprising:
allowing a user to change a first value associated with a first one of the blocks in a particular one of the scenario processes, the first value having dependent values associated with a second one of the blocks;
correcting change information associated with a first subset of the scenario processes to account for the change to the first value and corresponding changes to the dependent values, the first subset of the scenario processes being above the particular scenario process in the hierarchy and related thereto;
effecting computations in at least one of the first subset of scenario processes with reference to the changes to the first and dependent values; and
identifying the first value in the particular scenario process as inconsistent with corresponding values in a second subset of the scenarios below the particular scenario process in the hierarchy and related thereto.

34. The method of claim 17 wherein the dependency information comprises a bitmap relationship between source and target dimensions.

35. The method of claim 30 wherein the dependency information comprises a bitmap relationship between source and target dimensions.

36. A computer program product for updating a database using a multi-dimensional data model in which data corresponding to the database are organized in multi-dimensional blocks, each block having summary information associated therewith corresponding to a current state of evolution of the associated block, the computer program product comprising at least one computer-readable medium having computer program instructions stored therein which are configured to enable at least one computing device to:
   maintain dependency information in the data model which identifies data dependencies within and among the blocks;
   maintain a temporally sequential log of change information which identifies first changes and second changes made to particular ones of the blocks and times at which the changes were made wherein the change information comprises a list of change list entries, each change list entry comprising a change list number and identifying one of the changes and wherein the summary information associated with each block comprises one of the change list numbers which corresponds to the current state of evolution of the block; and
   update the database with reference to the dependency information, the summary information, and the change information wherein updating includes determining a sequence in which the first changes and the second changes were committed to the underlying database based on the temporally sequential change information, applying the change information to the database in order of the determined sequence, including generating a dependency list of data changes whose data depends directly or indirectly from the prior changed data changes, and processing the data changes in the dependency list in accordance with a dependency update algorithm to update the data changes in the dependency list.

37. A computer program product for running multiple scenarios using data from an underlying database, the data being organized according to a multi-dimensional data model in which the data are organized in multi-dimensional blocks, each block having summary information associated therewith corresponding to a current state of evolution of the associated block, the data model further comprising dependency information which identifies data dependencies within and among the blocks, the computer program product comprising at least one computer-readable medium having computer program instructions stored therein which are configured to enable at least one computing device to:
   run a first scenario process in a first sandbox, the first scenario process maintaining first temporally sequential change information which identifies first changes made to copies of first ones of the blocks and times at which the first changes were made, the first scenario process facilitating recalculation of the copies of the first blocks and copies of first dependent blocks to incorporate the first changes wherein the first temporally sequential change information comprises a list of change list entries, each change list entry comprising a change list number and identifying one of the changes and wherein the summary information associated with each block comprises one of the change list numbers which corresponds to the current state of evolution of the block;
   run a second scenario process substantially simultaneously with the first scenario process in a second sandbox, the second scenario process maintaining second temporally sequential change information which identifies second changes made to copies of second ones of the blocks and times at which the second changes were made, the second scenario process facilitating recalculation of the copies of the second blocks and copies of second dependent blocks to incorporate the second changes wherein the second temporally sequential change information comprises a list of change list entries, each change list entry comprising a change list number and identifying one of the changes and wherein the summary information associated with each block comprises one of the change list numbers which corresponds to the current state of evolution of the block;
   wherein the first changes are not available to the second scenario process until committed to the underlying database, and wherein the second changes are not available to the first scenario process until committed to the underlying database; and
   updating the underlying database with reference to the dependency information, the summary information, and the first temporally sequential change information, thereby making the first changes available to the second scenario process wherein updating includes determining a sequence in which the first changes and the second changes were committed to the underlying database, applying the change information to the database in order of the determined sequence, including generating a dependency list of data changes whose data depends directly or indirectly from the prior changed data changes, and processing the data changes in the dependency list in accordance with a dependency update algorithm to update the data changes in the dependency list.

* * * * *

UNITED STATES PATENT AND TRADEMARK OFFICE
CERTIFICATE OF CORRECTION

PATENT NO. : 7,647,356 B2  Page 1 of 1
APPLICATION NO. : 10/841923
DATED : January 12, 2010
INVENTOR(S) : Anurag Gupta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,647,356 B2 | |
| APPLICATION NO. | : 10/841923 | |
| DATED | : January 12, 2010 | |
| INVENTOR(S) | : Anurag Gupta | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

In column 9, line 26, delete "embodiment of the" and insert -- embodiment. --, therefor.

In column 13, line 51, delete "B 1" and insert -- B1 --, therefor.

In column 15, line 8, delete "B 1," and insert -- B1, --, therefor.

Signed and Sealed this

Twenty-third Day of November, 2010

David J. Kappos
*Director of the United States Patent and Trademark Office*